United States Patent Office 3,441,423
Patented Apr. 29, 1969

3,441,423
COATING COMPOSITIONS CONTAINING POLY-
UNSATURATED BIS-1,3-DIOXOLANES
Heinz F. Reinhardt, Claymont, Del., assignor to E. I.
du Pont de Nemours and Company, Wilmington, Del.,
a corporation of Delaware
No Drawing. Continuation-in-part of application Ser. No.
425,601, Jan. 14, 1965. This application Dec. 14, 1967,
Ser. No. 690,395
Int. Cl. C09d 3/60
U.S. Cl. 106—287                          3 Claims

ABSTRACT OF THE DISCLOSURE

Coating compositions containing bis-dioxolanes of the general structure

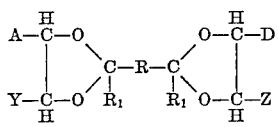

and a siccative metal drier.

CROSS-REFERENCES TO RELATED APPLICATIONS

This application is a continuation-in-part of application Ser. No. 425,601, filed Jan. 14, 1965, which, in turn, is a divisional of application Ser. No. 57,389, filed Oct. 25, 1960, both now abandoned.

BACKGROUND OF THE INVENTION

This invention relates to chemical products and more particularly to air-drying, film-forming bis-1,3-dioxolanes and compositions formed therewith.

In recent years, considerable emphasis has been placed on the search for new air-drying, film-forming materials, that is, compounds which, when exposed to air, in particular oxygen at room temperature, are converted to solvent-insoluble films and coatings. One aspect of the aforementioned interest in air-drying materials has been the desire to reduce or even eliminate the costly drying procedures now used for many coating compositions. Another aspect has been the search for liquid, usually monomeric, film-forming materials which can be used as coating compositions containing little, and in some cases, no solvent, thus, for example, reducing the number of passes needed to yield a coating of a given thickness. Of course, coupled with the aforementioned objectives, have been the objectives of finding materials with improved film-forming properties such as, for example, improved solvent resistance, hardness and gloss.

SUMMARY OF THE INVENTION

The subject invention provides a new class of air-drying, film-forming materials which can be formulated into coating compositions which can be applied and dried at room temperature or for a short time at slightly elevated temperature to yield hard, adherent, glossy, solvent-resistant tack-free films. Many of the compounds of this invention are liquids which can be used in coating compositions containing little or no solvent.

The products of this invention are bis-1,3-dioxolanes having the structural formula:

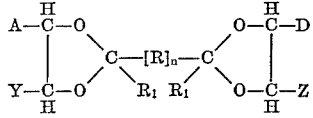

where

R can be alkylene of 1 through 10 carbon atoms, phenylene,

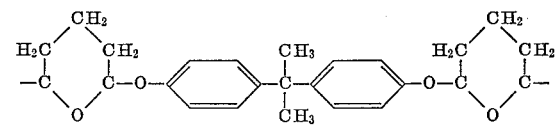

or

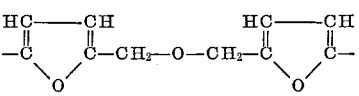

R₁ can be hydrogen, phenyl or alkyl of 1 through 4 carbon atoms;
A, Y, D and Z can be hydrogen, alkenyl of 2 or 3 carbon atoms, alkyl of 1 through 4 carbon atoms, α-furfuryl, α-furyl, α-chlorovinyl, α-furylvinyl styryl or phenyl, provided that one of A and Y and one of D and Z must be alkenyl; and
n can be 0 or 1, provided that when R is alkylene, n can be 2 to give a dialkylene bridge, in which case R₁ is absent.

Preferred for their drying properties are compounds in which two of A, Y, D or Z are vinyl or isopropenyl. Highly preferred is bis-(4,5-divinyl-1,3 - dioxolan - 2 - yl) methane.

Compounds of this invention are prepared by reacting two moles of an ethylene glycol substituted with A, Y, D or Z, as defined above, with a dialdehyde or diketone of the formula

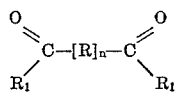

wherein n, R and R₁ are defined as above, or a lower alkyl tetraacetyl or ketal thereof, at a temperature of about from 50° C. to 150° C., in the presence of acidic catalyst. In the case of dialdehydes and diketones, the reaction is preferably run at temperatures of about 75° to 125° C., in the presence of solvents such as toluene, xylene, benzene, carbon tetrachloride, octane and the like which are used to azeotropically distill the water by-product from the reaction mixture. With the acetals and ketals, the reaction temperature preferably is about from 60° C. to 100° C. The lower alkyl, that is, 1 to 8, and preferably 1 to 2 carbon-atom alkanol by-products are continuously distilled therefrom during the reaction.

The reaction usually runs about from 20 minutes to 10 hours, and preferably from 30 minutes to 3 hours, depending largely upon the particular reactants employed, the amount of catalyst and the temperature of reaction. Generally, the rate of reaction increases with the reaction temperature and amount of catalyst and also is faster with aldehydes and acetals than with ketones and ketals. The use of tetraketals, and particularly tetraacetals is preferred because no solvent is usually required and secondly, because tetraacetals and tetraketals lead to fewer undesirable by-products. Usually, substantially equivalent amounts of reactants or a small excess, for example, less than about 50% excess, of glycol is used.

Examples of catalysts which can be used in the aforementioned reaction are, for example, strong mineral acids, such as hydrochloric acid, sulfuric acid, phosphoric acid; organic acids such as oxalic acid, p-toluene sulfonic acid and various combination catalysts such as small portions of strong mineral acids deposited on highly-porous, silica-alumina carriers. About from 0.2 to 5% by weight of catalyst based on the weight of the reactants is normally employed. Stabilizers such as, for example, hydroquinone and tertiarybutyl catechol can, and usually are added to the reaction mixture in conventional amounts.

For most uses, for example, for coating compositions, the compounds of this invention are usually mixed with metallic driers such as lead, manganese, zinc, iron, nickel, cadmium, copper, tin, zirconium and preferably cobalt salts. Such salts are, for example, acetates, naphthenates, linoleates, resinates, tallates, oxalates and phthalates of the aforementioned metals. Cobalt partial esters of dicarboxylic acids such as the $C_1$ to $C_{18}$ alkyl acid phthalates, malonates, succinates, adipates and sebacates are particularly preferred. Usually about from 0.0005% to 3% and preferably 0.01% to 1.0% of metal based on the weight of bis-dioxolane is used.

Other additives which can be added to the products of this invention in formulating various products include solvents, plasticizers, pigments and extenders, inhibitors, flow-control agents and the like.

Examples of solvents are toluene, xylene, benzene, butyl acetate, acetone, methyl isobutyl ketone, butyl ether and other aliphatic, cycloaliphatic and aromatic hydrocarbons, esters, ethers, ketons and alcohols.

Examples of plasticizers which can be used in conventional amounts are benzyl butyl phthalate, dibutyl phthalate, triphenyl phosphate, 2-ethylhexyl benzyl phthalate, di(cyclohexyl) phthalate and mixtures thereof.

Examples of pigments and extenders which can be used in conventional amounts are metal oxides, hydroxides, chromates, silicates, sulfides, sulfates, carbonates, organic dyes and the likes thereof and metal flake pigments.

In forming various compositions, particularly coating compositions, various other film-forming materials can be added to the compositions of this invention such as, for example, polymers and copolymers of acrylic esters, vinyl acetate and styrene and unsaturated polyesters.

Clear coating compositions of this invention can be prepared by merely mixing the various ingredients.

With many of the compounds of this invention which are liquid at room temperature, the bis-dioxolanes can merely be applied directly, or preferably mixed with metallic drier and then applied.

When pigmented compositions are prepared, preferably the pigment is first ground with at least a portion of a film-forming material and sometimes solvent, then mixed with the remaining components of the compositions.

The compositions of this invention are particularly useful in preparing coating compositions which form hard, glossy, solvent-resistant films and coatings by air-drying at room temperature. With mild forced-drying at slightly elevated temperature, for example, 50 to 150° C., the drying of films of the compositions of this invention can be reduced, for example, to a matter of minutes.

Compositions formed with the products of this invention also are useful, for example, as impregnants for fabrics and as laminating adhesives. Because of their polyethylenic functionality, compounds of this invention also are useful, for example, as crosslinking agents for polymers such as copolymers of the products of this invention and, for example, natural drying oils, triallyl cyanurate, styrene, acrylonitrile and acrylic esters.

DESCRIPTION OF THE PREFERRED EMBODIMENTS

In the following examples, which illustrate the invention, parts and percentages are by weight unless otherwise indicated.

Example 1

57 parts (0.5 mole) of 1,2-divinyl ethylene glycol, 45 parts (0.25 mole) of 1,1,3-trimethoxy-3-ethoxy propane, 0.25 part of catalyst comprising highly-porous silica-aluminum carrier on which is deposited about 0.05 millimole of orthophosphoric acid are mixed, then heated in a reaction vessel at about 90° C. for one hour. During the reaction ethanol and methanol by-products are continuously removed from the reaction mixture. Finally, the reaction mixture is distilled under reduced pressure to give a 42% yield, of bis-(4,5-divinyl-1,3-dioxolan-2-yl) methane having a boiling point at 0.1 millimeter of mercury absolute of 92° C. and a refractive index at 25° C. of 1.4765. The above product has the structural formula:

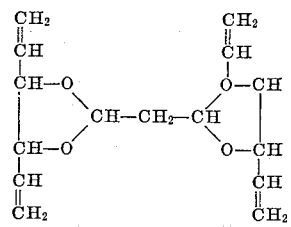

A clear coating composition is prepared by mixing 2.5 parts of the product of this example with 0.125 part of a solution of cobalt butyl phthalate containing about 0.01% by weight of cobalt. The resulting composition dries to a clear, hard, tack-free film at room temperature in a few days, and to a similar state within 20 minutes at 110° C.

A pigmented coating composition is prepared by grinding 60 parts of titanium dioxide in 100 parts of bis-(4,5-divinyl-1,3-dioxolan-2-yl) methane prepared as described above and 100 parts of toluene until a smooth uniform dispersion is obtained. Next, 0.5 part of cobalt butyl phthalate is dissolved in the above composition. The resulting produce can be sprayed onto any of a wide variety of substrates such as glass ceramics, wood and metal to yield hard, glossy, tack-free solvent-resistant films which dry in a manner similar to that of the clear compositions described above.

Example 2

Forty parts of a 30% aqueous solution of glyoxal are mixed with 75 parts of toluene and heated in a reaction vessel until all of the water is azeotropically distilled from the mixture. During this operation, toluene is constantly recycled. Next, 57 parts of 1,2-divinyl ethylene glycol, 0.25 part of a catalyst comprising a highly porous, silica alumina carrier on which is deposited 0.025 millimole of sulfuric acid are added to the reaction vessel and heated for two hours at about 90 to 125° C. During the reaction, water is continuously azeotropically distilled from the reaction vessel. Finally, the solvent is stripped from the reaction mixture under reduced pressure and then the residue is fractionated at a pressure of about 0.1 millimeter of mercury absolute to yield bis-(4,5-divinyl-1,3-dioxolan-2-yl) having the structure

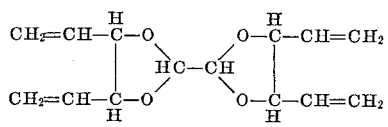

The product of this example containing about 1% of cobalt butyl phthalate air dries at room temperature to a hard tack-free film in a few days and at 110° C. achieves a comparable state in about 30 minutes.

Example 3

94 parts (0.4 mole) of suberic aldehyde tetramethyl acetal are mixed with 92 parts (0.8 mole) of 1,2-divinyl ethylene glycol and a trace of hydrochloric acid. The reaction mixture is heated for 30 minutes at 75 to 110° C while methanol by-product is continuously removed from the reaction mixture. Next, the reaction product is stirred with 5 parts of anhydrous potassium carbonate to remove the hydrochloric acid catalyst. The resulting product is filtered, then fractionated under reduced pressure to yield 130 parts of bis-(4,5-divinyl-1,3-dioxolan-2-yl) hexane boiling at a temperature of 157 to 166° C. at a pressure of 0.3 to 0.6 millimeter of mercury absolute and having a refractive index of about 1.4768. Analysis shows the product contains 72.64% carbon, 9.27% hydrogen compared wtih theoretical values of 71.82% and 9.04%, respectively. The compound has the structure

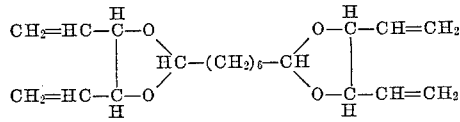

About 0.02 part of cobalt in the form of cobalt butyl phthalate is mixed with 5 parts of the compound of this example described above. The resulting composition coated onto steel panels, dries overnight to a tack-free state. After 15 minutes at 150° C., a wet coating of the above composition becomes hard, glossy, tack-free and transparent, has a Knoop hardness of about 10.9, good adhesion and is insoluble in solvents including acetone, toluene and carbon tetrachloride. After 25 days storage at room temperature, the Knoop hardness of the above mildly-baked film increases to about 14.3.

Example 4

57 parts (0.5 mole) of 1,2-divinyl ethylene glycol are mixed with 33.5 parts ( 0.25 mole) of terephthaldehyde, 0.5 part of a catalyst comprising 0.3 millimole of orthophosphoric acid deposited on a highly-porous silica-alumina carrier and 75 parts of toluene. The above reaction mixture is heated at reflux for 3½ hours while water is continuously removed therefrom. Next, the reaction mixture is stirred with potassium carbonate to neutralize the catalyst and filtered, then the toluene solvent is stripped therefrom. Finally, the resulting product is fractionally distilled under reduced pressure to take off the low boiling materials and yield crude bis-(4,5-divinyl-1,3-dioxolan-2-yl) benzene. The resulting product is then cooled to room temperature and recrystallized from ethanol to yield a product melting at 71 to 72° C. Analysis shows the product contains 73.60% carbon and 6.82% hydrogen compared with theoretical values of 73.60% and 6.79%, respectively.

A coating composition is prepared by mixing 10 parts of the above compound with 5 parts of toluene and 0.1 part of cobalt butyl phthalate. The resulting composition is coated onto steel panels, inserted into an oven and heated at 100° C. After 10 minutes, a clear, hard, glossy, tack-free and solvent-resistant film is obtained.

Example 5

114 parts of 2,2-bis-(4'-hydroxyphenyl) propane are dissolved in 250 parts of dioxane at room temperature, a trace of hydrochloric acid is added thereto, then 112 parts of acrolein dimer is added thereto slowly at a temperature below about 5° C. The reaction mixture is allowed to warm to room temperature and held at that temperature for about 2 days.

About 11.4 parts of 1,2-divinyl ethylene glycol and 25 parts of toluene are mixed with 45.2 parts of the above reaction mixture, then a trace of hydrochloric acid is added thereto. The resulting mixture is heated at reflux temperature while water is continuously distilled therefrom. After water separation has ceased, the product is cooled to room temperature and neutralized with anhydrous potassium carbonate. The product is finally filtered and stripped of toluene under reduced pressure to yield bis-(4,5-divinyl-1,3-dioxolan-2-yl)-bis[p - (2 - tetrahydropyranoxy-6-yl) phenyl]propane having the structural formula:

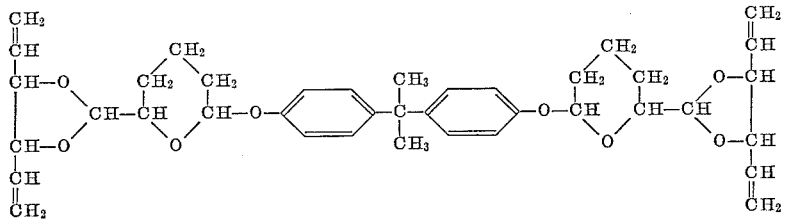

About 1% of cobalt butyl phthalate is added to the above product which is then spread on panels and air dried at room temperature or baked at elevated temperatures for short periods. The dried films are hard, clear, tack-free, glossy and solvent-resistant.

Example 6

Fifty parts of 1,2-divinyl ethylene glycol, 25 parts of acetonyl acetone, 0.3 part of p-toluene sulfonic acid and 50 parts of toluene are charged to a reaction vessel and heated at reflux, about 130 to 142° C., for 3 hours. Toluene is stripped from the resulting reaction mixture at reduced pressure, than the mixture is fractionated under reduced pressure to yield a prdouct boiling at about 96° C. at 0.2 millimeter of mercury absolute and having a refractive index at 25° C. of 1.4712. Analysis of the resulting yellow, viscous liquid shows 70.41% carbon and 8.61% hydrogen as compared with theoretical values of 70.56% and 8.55%, respectively.

The product, 1,2-bis-(2-methyl-4,5-divinyl-1,3-dioxolan-2-yl)ethane, has the structure

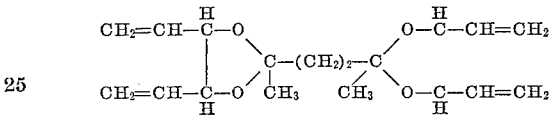

Example 7

57 parts (0.5 mole) of 1,2-divinyl ethylene glycol, 62 parts (0.25 mole) of glutaraldehyde tetraethyl acetal and 0.15 part of p-toluene sulfonic acid are charged to a reaction vessel and heated at reflux, about 80° C., for one hour. The ethanol by-product is continuously distilled from the reaction mixture. The resulting product is then distilled under reduced pressure to yield bis-(4,5-divinyl-1,3-dioxolan-2-yl)propane, a colorless liquid having the structural formula:

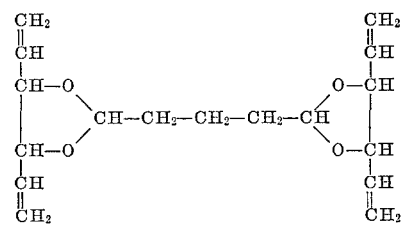

Example 8

114 parts (1 mole) of 1,2-divinyl ethylene glycol are charged to a reaction vessel along with 131 parts (0.5 mole) of 1,1,6,6-tetraethoxy hexane. A trace of hydrochloric acid is bubbled into the reaction mixture which is then heated at the reflux temperature, about 80 to 85° C., until the evolution of ethyl alcohol by-product has substantially ceased. Next, potassium carbonate is added to the resulting reaction mixture to neutralize the hydrochloric acid catalyst and the resulting product is diluted with about 50% of diethyl ether and filtered. The diethyl ether is then stripped from the resulting product under reduced pressure to yield bis-(4,5-divinyl-1,3-dioxolan-2-yl)butane.

Example 9

142 parts (1 mole) of 1,2-diisopropenyl ethylene glycol are mixed with 132 parts (0.5 mole) of 1,1,6,6-tetraethoxy hexane, then a trace of hyddrochloric acid is bubbled into the reaction mixture. The resulting product is heated for

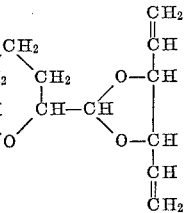

about 1 hour at the reflux temperature, then fractionally distilled under reduced pressure to yield bis-(4,5-diisopropenyl 1,3-dioxolan-2-yl)butane, a colorless, odorless, rather viscous liquid. This compound has the structure

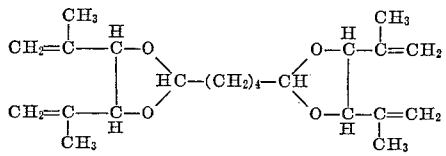

The following glycols can be substituted for 1,2-diisopropenyl ethylene glycol, in the same proportions, to give the corresponding products:

1-styryl-2-vinyl ethylene glycol
1-α-chlorovinyl-2-vinyl ethylene glycol
1-α-furyl vinyl-2-vinyl ethylene glycol.

Each compound made in this example can be formulated into a coating composition by mixing it with 1%, by weight, of cobalt butyl phthalate. These compositions, when spread on a suitably primed metal panel, will dry to hard, tack-free films in a few days at room temperature, or in 30 minutes at 110° C.

Example 10

About 17 parts (0.1 mole) of 1-furyl-2-isopropenyl ethylene glycol are mixed with 12 parts (0.5 mole) of oxy-bis-(5-methylene-2-furaldehyde), 50 parts of toluene and 0.1 part of a catalyst comprising highly-porous, silica-alumina carrier on which is deposited about 0.02 millimole of orthophosphoric acid. The resulting reaction mixture is refluxed for two hours at which time the azeotropic distillation of water by-product has substantially ceased.

The resulting reaction mixture is then filtered and toluene is stripped therefrom under reduced pressure to yield bis-(4-furyl-5-isopropenyl-1,3-dioxolan - 2 - yl)-oxy-bis-(5-methylene-2-furan) having the formula

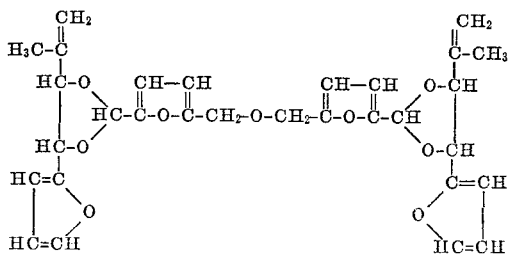

A coating composition can be prepared by mixing 100 parts of this compound, 50 parts of TiO$_2$ and 75 parts of xylene and then pebble-milling this mixture until it is smooth. To this is then added 0.75 part of cobalt naphthenate. The resulting composition, when sprayed on a suitably primed metal panel, will dry to a hard tack-free film in a few days at room temperature, or in 20 minutes at 90° C.

Example 11

11.7 parts (0.5 mole) of oxy-bis-(5-methylene-2-furaldehyde) are added to 14.2 parts (0.1 mole) of 1,2-divinyl-1,2-dimethyl ethylene glycol, and then 50 parts of xylene and 0.1 part of a carrier comprising highly-porous, silica-alumina carrier on which is deposited 0.02 millimole of orthophosphoric acid are added.

The resulting reaction mixture is refluxed for 2½ hours, at which time the evolution of water has substantially ceased. The reaction product is then cooled to room temperature and filtered. Xylene is stripped from the resulting product under reduced pressure to yield bis-(4,5-divinyl-4,5-dimethyl-1,3-dioxolan-2-yl) - oxy - bis-(5-methylene-2-furan).

A coating composition can be prepared with this compound by adding 1% of cobalt butyl phthalate. This composition, when applied to a suitably primed metal panel, will dry to a hard tack-free film in several days at room temperature, or in 30 minutes at 120° C.

Example 12

To 23 parts (0.2 mole) of 1,2-divinyl ethylene glycol are added 22 parts (0.1 mole) of 1,3-diphenyl-1,3-propane dione, 70 parts of xylene and 1.2 parts of p-toluene sulfonic acid. The resulting reaction mixture is heated at reflux for 4 hours while the water by-product is continuously azeotropically distilled therefrom. The resulting reaction product is cooled to room temperature, and xylene is stripped therefrom under reduced pressure to yield bis - (2-phenyl-4,5-divinyl-1,3-dioxolan-2-yl) methane, having the structure

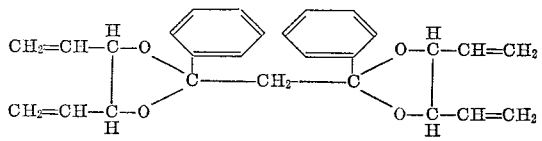

Example 13

8.1 parts (0.05 mole) of p-diacetyl benzene are mixed with 17.6 parts (11 moles) of 1-phenyl-2-vinyl ethylene glycol, 0.2 part of oxalic acid and 50 parts of toluene. The resulting mixture is heated for 6 hours at 110–118° C. Water is continuously azeotropically distilled off during the reaction.

Solvent and oxalic acid are then stripped from the reaction mixture to yield p-bis-(2-methyl-4-phenyl-5-vinyl-1,3-dioxolan-2-yl) benzene which has the structural formula

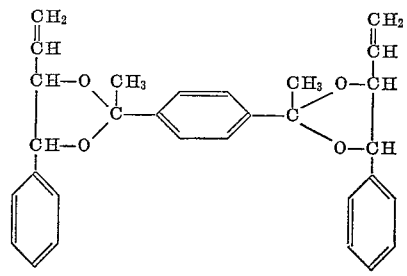

Example 14

Twenty-five parts of glutaraldehyde tetraethylacetal (0.1 mole) are mixed with 33.6 parts (0.2 mole) of 2-vinyl-2-furfuryl ethylene glycol and 0.1 part of hydrochloric acid. The resulting mixture is heated for 3 hours at 80–85° C. while ethanol is continuously distilled therefrom.

The resulting product, bis-(5-vinyl-5-furfural-1,3-dioxolan-2-yl) propane, has the structural formula:

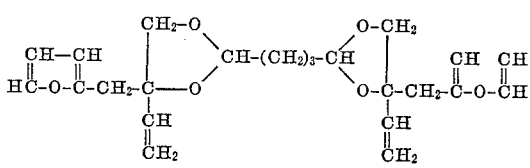

A coating composition can be prepared from this compound by mixing 100 parts of it with 55 parts of TiO$_2$ and 10 parts of xylene, then adding 0.75 parts of cobalt naphthenate and sand grinding the mixture. This composition, when coated on a suitably primed metal panel, will dry to a hard tack-free film in several days at room temperature, or in 20 minutes at 120° C.

Example 15

About 5.6 parts (0.05 mole) of cyclohexane-1,4-dione are mixed with 12.8 parts (0.1 mole) of 1-vinyl-2-isopropenyl ethylene glycol, 0.1 part of p-toluene sulfonic acid and 50 parts of xylene. The resulting mixture is heated for 5 hours at 125–140° C. as water is continuously azeotropically distilled therefrom.

The reaction mixture is then washed with an aqueous solution of sodium hydroxide to remove the p-toluene sulfonic acid catalyst. Xylene is stripped therefrom under reduced pressure to yield bis-(2,2-dimethylene-4-vinyl-5-isopropenyl-1,3-dioxolane) having the formula

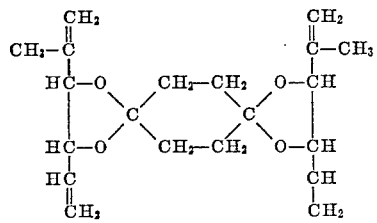

I claim:
1. An air-drying coating composition consisting essentially of bis-(4,5-divinyl-1,3-dioxolan-2-yl) methane and a siccative metal drier.

2. An air-drying coating composition consisting essentially of 1,4-bis-(4,5-divinyl-1,3-dioxolan-2-yl) benzene and a siccative metal drier.

3. An air-drying coating composition consisting essentially of 1,3-bis-(4,5-divinyl-1,3-dioxolan-2-yl) propane and a siccative metal drier.

References Cited

UNITED STATES PATENTS 3,010,923  11/1861  Ikeda _____ 260—23

OTHER REFERENCES

Orth: "Angewandte Chemie" (1952), vol. 64, No. 19, pp. 547, 548, 550.

JULIUS FROME, *Primary Examiner.*

T. MORRIS, *Assistant Examiner.*

U.S. Cl. X.R.

260—23